US010196238B2

(12) United States Patent
King

(10) Patent No.: US 10,196,238 B2
(45) Date of Patent: Feb. 5, 2019

(54) ARTICULATED FUNICULATOR

(71) Applicant: Fritz King, Stockholm (SE)

(72) Inventor: Fritz King, Stockholm (SE)

(73) Assignee: Fritz King AB, Stockholm (SE)

( * ) Notice: Subject to any disclaimer, the term of this patent is extended or adjusted under 35 U.S.C. 154(b) by 0 days.

(21) Appl. No.: 14/792,293

(22) Filed: Jul. 6, 2015

(65) Prior Publication Data

US 2015/0375964 A1  Dec. 31, 2015

Related U.S. Application Data

(63) Continuation of application No. 14/397,025, filed as application No. PCT/EP2012/005177 on Dec. 15, 2012.

(Continued)

(51) Int. Cl.
*B66B 9/00* (2006.01)
*B66B 9/10* (2006.01)
*B66B 11/02* (2006.01)

(52) U.S. Cl.
CPC ............... *B66B 9/00* (2013.01); *B66B 9/003* (2013.01); *B66B 9/10* (2013.01); *B66B 11/02* (2013.01);
(Continued)

(58) Field of Classification Search
CPC ....... B66B 11/02; B66B 11/0206; B66B 9/00; B66B 9/003; B66B 9/10; B66B 2009/006;
(Continued)

(56) References Cited

U.S. PATENT DOCUMENTS 631,988 A    8/1899  Feldman
1,943,119 A *  1/1934  James ...................... B66B 9/10
                                                           198/322
(Continued)

FOREIGN PATENT DOCUMENTS

CN       1868849 A     11/2006
CN     101875465 A     11/2010
(Continued)

OTHER PUBLICATIONS

CN Patent Application No. 201280072660.X Office Action dated Sep. 30, 2015.
(Continued)

*Primary Examiner* — Michael A Riegelman
(74) *Attorney, Agent, or Firm* — Renner, Otto, Boisselle & Sklar, LLP

(57) ABSTRACT

The disclosure is related to systems and methods regarding transit and movement of people. The Articulated Funiculator is a continuous and connected system of trains that moves people in mass. The trains lie horizontal at specific floor levels (designated as stations) in tall buildings or underground levels (designated as stations) in mining operations and underground subway stations. The Articulated Funiculator transitions from horizontal alignments at the stations to vertical, slanted or curved alignments between the stations, albeit the passengers remain horizontal in a standing position. The Articulated Funiculator captures the energy from the braking, dynamic braking' of the trains and stores it. The stored energy is then used to accelerate the Articulated Funiculator. This re-use of energy makes the Articulated Funiculator sustainable.

24 Claims, 17 Drawing Sheets

Related U.S. Application Data

(60) Provisional application No. 61/687,450, filed on Apr. 26, 2012.

(52) U.S. Cl.
CPC ..... *B66B 11/0206* (2013.01); *B66B 2009/006* (2013.01); *Y02B 50/12* (2013.01)

(58) Field of Classification Search
CPC .... E04H 1/04; E04H 6/12; E04H 6/14; E04H 9/02; Y02B 50/12
USPC ......................................................... 187/249
See application file for complete search history.

(56) References Cited

U.S. PATENT DOCUMENTS

| | | | | |
|---|---|---|---|---|
| 2,698,973 | A * | 1/1955 | Zeckendorf | E04H 1/04 52/185 |
| 2,731,160 | A * | 1/1956 | Maier | E04H 6/14 198/797 |
| 3,317,005 | A * | 5/1967 | Kehoe | B66B 9/003 104/25 |
| 3,378,151 | A * | 4/1968 | Salloum | E04H 6/28 414/233 |
| 3,495,545 | A | 2/1970 | Radovic | |
| 3,610,160 | A * | 10/1971 | Alimanestianu | B61B 15/00 104/127 |
| 3,626,857 | A * | 12/1971 | Omar | B61F 9/00 104/119 |
| 3,658,155 | A * | 4/1972 | Salter | B66B 9/00 187/270 |
| 3,750,354 | A * | 8/1973 | Boros | E04H 1/04 52/220.2 |
| 3,896,736 | A * | 7/1975 | Hamy | B66B 9/10 104/127 |
| 3,918,367 | A | 11/1975 | Alimanestianu et al. | |
| 4,290,724 | A * | 9/1981 | Lichti | E04H 6/42 198/800 |
| 4,503,778 | A * | 3/1985 | Wilson | B61B 1/02 104/119 |
| 4,592,270 | A * | 6/1986 | Vener | A62C 3/04 187/414 |
| 4,603,638 | A | 8/1986 | Dozer | |
| 5,288,956 | A | 2/1994 | Kadokura et al. | |
| 5,651,426 | A * | 7/1997 | Bittar | B66B 1/2458 187/249 |
| 5,758,748 | A * | 6/1998 | Barker | B66B 9/003 187/249 |
| 5,877,462 | A * | 3/1999 | Chenais | B66B 5/0031 187/249 |
| 5,957,056 | A * | 9/1999 | Behar | B61B 3/00 104/173.1 |
| 6,085,873 | A * | 7/2000 | Macchi | B65G 51/04 187/273 |
| 6,354,404 | B1 * | 3/2002 | Sansevero | B66B 9/02 187/249 |
| 6,955,245 | B2 * | 10/2005 | Dunser | B66B 1/2466 187/249 |
| 7,377,218 | B2 * | 5/2008 | Hyacinthe | A62B 5/00 104/127 |
| 7,554,278 | B2 * | 6/2009 | Wegner-Donnelly | B66C 13/18 187/277 |
| 7,621,376 | B2 * | 11/2009 | Duenser | B66B 9/00 187/247 |
| 8,602,168 | B2 * | 12/2013 | Tschuppert | B66B 9/00 187/249 |
| 8,683,923 | B2 | 4/2014 | MacMahon et al. | |
| 9,248,994 | B2 * | 2/2016 | Grundmann | B66B 9/00 |
| 2001/0020429 | A1 | 9/2001 | Serrano | |
| 2004/0206018 | A1 | 10/2004 | Stewart et al. | |
| 2008/0173208 | A1 | 7/2008 | Heinrich | |
| 2009/0211853 | A1 * | 8/2009 | Jylha | B66B 9/193 187/289 |
| 2011/0132250 | A1 * | 6/2011 | Nelson | E04H 1/04 114/266 |
| 2011/0179732 | A1 * | 7/2011 | Ermer | B08B 15/00 52/236.3 |

FOREIGN PATENT DOCUMENTS

| | | |
|---|---|---|
| CN | 102145843 | 8/2011 |
| DE | 195 46 694 A1 | 12/1995 |
| GB | 6 315 42 A | 11/1949 |
| JP | 63-97587 | 4/1988 |
| JP | H022 25283 A | 9/1990 |
| JP | WO 1991 018820 A1 | 12/1991 |
| JP | H04-361969 A1 | 12/1992 |
| JP | H05-124781 A | 5/1993 |
| JP | H051 39661 A | 6/1993 |
| JP | H05-193869 A | 8/1993 |
| JP | H06-100272 A | 4/1994 |
| JP | 8061 44745 A | 5/1994 |
| JP | H061 44745 A | 5/1994 |
| JP | H07-112875 A | 5/1995 |
| JP | H07-289653 A | 7/1995 |
| JP | 7277615 | 10/1995 |
| JP | 8-302819 | 11/1996 |
| JP | H09-058946 A | 3/1997 |
| JP | H09-295780 A | 11/1997 |
| JP | 2904670 B2 | 3/1998 |
| JP | H11-263553 A | 9/1999 |
| JP | 2001340476 A | 12/2001 |
| JP | 2004-035254 A | 2/2004 |
| JP | 2005145668 A | 6/2005 |
| JP | 2005-240519 A | 9/2005 |
| JP | 2006045966 A | 2/2006 |
| JP | 2007230753 A | 9/2007 |
| JP | 2010064864 A | 3/2010 |
| JP | 2011-020841 A | 2/2011 |
| JP | 2011-020874 A | 2/2011 |
| JP | H04-140367 A | 5/2014 |
| JP | 2015-526357 | 9/2015 |
| KR | 10-20100102400 A | 9/2010 |
| WO | 2002/029030 | 8/2002 |
| WO | WO 2010/043654 A2 | 4/2010 |
| WO | 2011140887 | 11/2011 |

OTHER PUBLICATIONS

EP Patent Application No. 15174791.2 European Search Report dated Nov. 3, 2015.
EP Patent Application No. 15171371.6 European Search Report dated Nov. 11, 2015.
KR Patent Application No. KR 10-2015-7016302 dated Feb. 22, 2016.
KR Patent Application No. KR 10-2015-7018348 dated Feb. 22, 2016.
CN Patent Application No. CN 2012-80072660 Office Action dated Sep. 30, 2015 Translation, 1 pg.
CN Patent Application No. CN 150930 Office Action dated Sep. 30, 2015, Translation, 1 pg.
KR Patent Application No. KR 10-2015-7016302 Office Action dated Dec. 22, 2015 Translation, 1 pg.
KR Patent Application No. KR 10-2015-7018348 Office Action dated Dec. 22, 2015 Translation, 1 pg.
JP Patent Application No. JP 160308 Office Action dated Mar. 8, 2016, Translation, 12 pgs.
CN Patent Application No. CN 2012-80072660 2nd Office Action dated May 5, 2016, Translation, 7 pgs.
Japanese Patent Application No. 2015-137673 Office Action dated Nov. 15, 2016 with machine translation.
Chinese Patent Application No. 201280072660.X Office Action dated Nov. 7, 2016 with machine translation.
Chinese Patent Application No. CN 2015-10402436 Office Action dated Feb. 3, 2017, with translation, 6 pgs.

(56) References Cited

OTHER PUBLICATIONS

Chinese Patent Application No. CN 2015-10392346 Office Action dated Mar. 16, 2017, with translation, 6 pgs.
European Patent Application No. EP 12 081 5636 Office Action dated Mar. 14, 2017, 7 pgs.
Japanese Patent Application JP 2015-137674 Decision to Grant dated Mar. 14, 2017, with translation, 6 pgs.
Korean Patent Application KR 2014-7033247 Decision to Grant dated Mar. 17, 2017, with translation, 3 pgs.
JP Patent Application No. JP 2015-137674 Office Action dated Jul. 28, 2016, with Translation, 11 pgs.
KR Patent Application No. 10-2015-7016302 Office Action dated Jun. 29, 2016, with Translation, 8 pgs.
KR Patent Application No. 10-2015-7018348 Office Action dated Jun. 29, 2016, with Translation, 5 pgs.
KR Patent Application No. 10-2014-7033247 Office Action dated Sep. 20, 2016, with Translation, 11 pgs.
Notice of Allowance on Japanese Counterpart 2015-137673 dated Jul. 18, 2017, with approximate translation of allowed claim 1, pp. 1-4.
European Patent Application No. EP 12 081 5636 Office Action dated Aug. 28, 2017, 4 pgs.
KR Patent Application No. 10-2015-7016302 Office Action dated Jun. 27, 2017, with Translation, 9 pgs.
CN Patent Application No. CN 2015-10392346 Office Action dated Oct. 10, 2017, with English summary, 6 pages.
KR Patent Application No. KR 10-2015-7016302 Office Action dated Oct. 27, 2017, with English summary, 5 pages.
International Search Report mailed for PCT/EP2012/005177 dated Apr. 16, 2013, 2 pages.
Official Action for corresponding European Patent Application No. 12815636.1 dated Mar. 14, 2018.
Official Action for corresponding Japanese Patent Application No. 2017-025956 dated Mar. 6, 2018 and its English translation.
Official Action for corresponding Japanese Patent Application No. 2017-025956 dated Nov. 20, 2018 and its English translation.

* cited by examiner

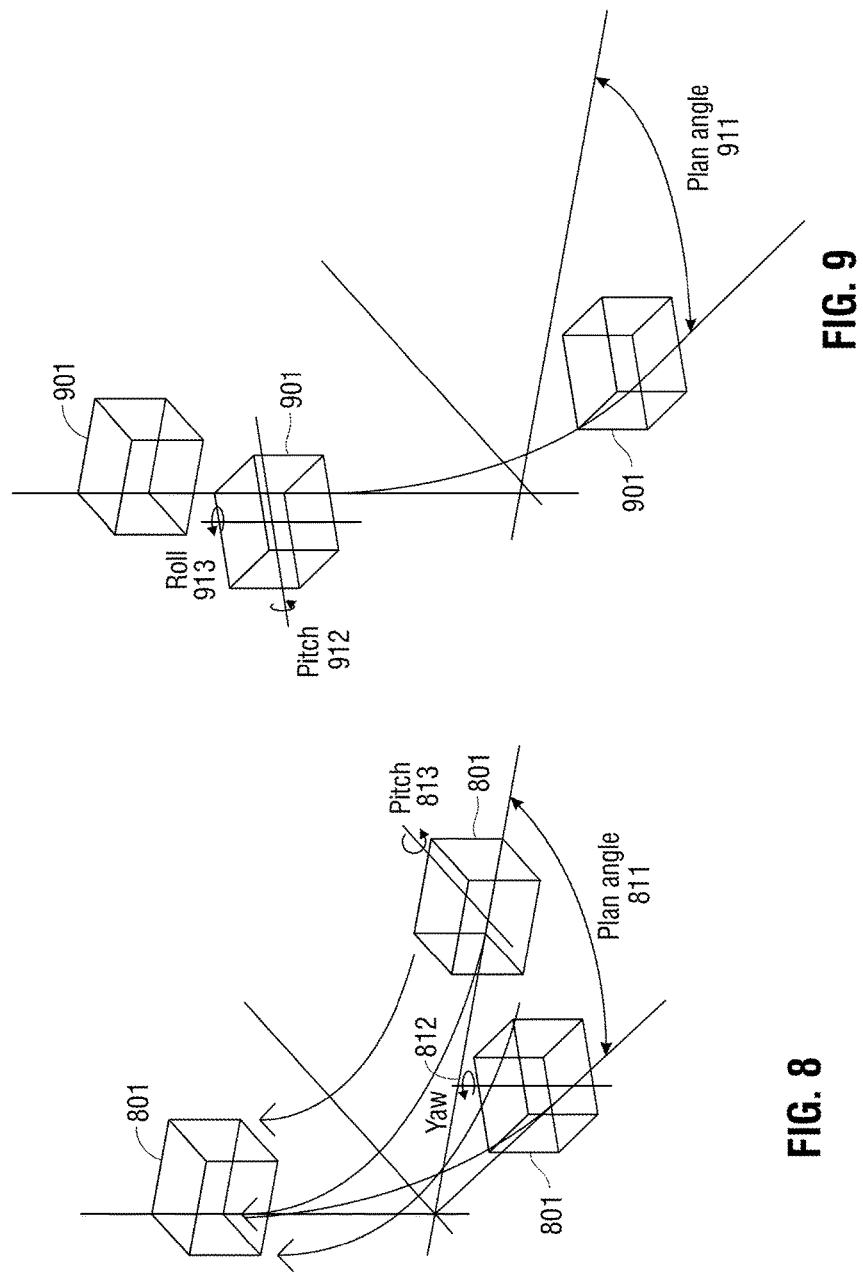

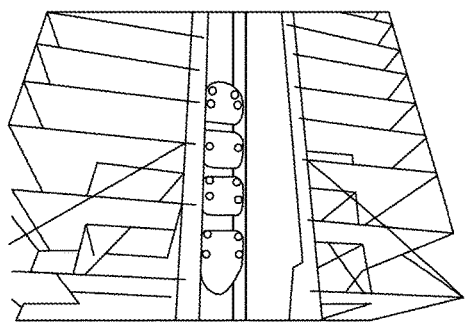 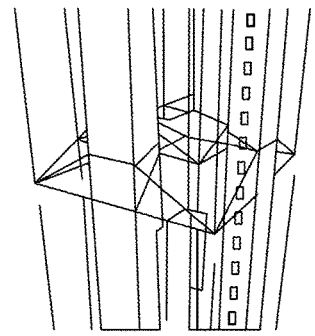
FIG. 22A  FIG. 22B

ARTICULATED FUNICULATOR

CROSS-REFERENCE TO RELATED APPLICATION(S)

The present application is a continuation of and claims priority to U.S. application Ser. No. 14/397,025 filed on Oct. 24, 2014, and entitled "ARTICULATED FUNICULATOR", which in turn claims priority to International Patent Application No. PCT/EP2012/005177, filed on Dec. 15, 2012, and entitled "ARTICULATED FUNICULATOR", which in turn claims priority to European Patent Application 12003610.8, filed on May 9, 2012 and to U.S. Provisional Patent Application No. 61/687,450, filed on Apr. 26, 2012, all of which are incorporated by reference herein in their entireties.

BRIEF DESCRIPTION OF THE DRAWINGS

FIG. 8 is a diagram of possible rotation of a passenger carriage around three axes, in accordance with certain embodiments;

FIG. 9 is a diagram of possible rotation of a passenger carriage around three axes, in accordance with certain embodiments;

FIG. 22 illustrates example views of various aspects of the articulated funiculator system, in accordance with certain embodiments;

DESCRIPTION

Figure 1:
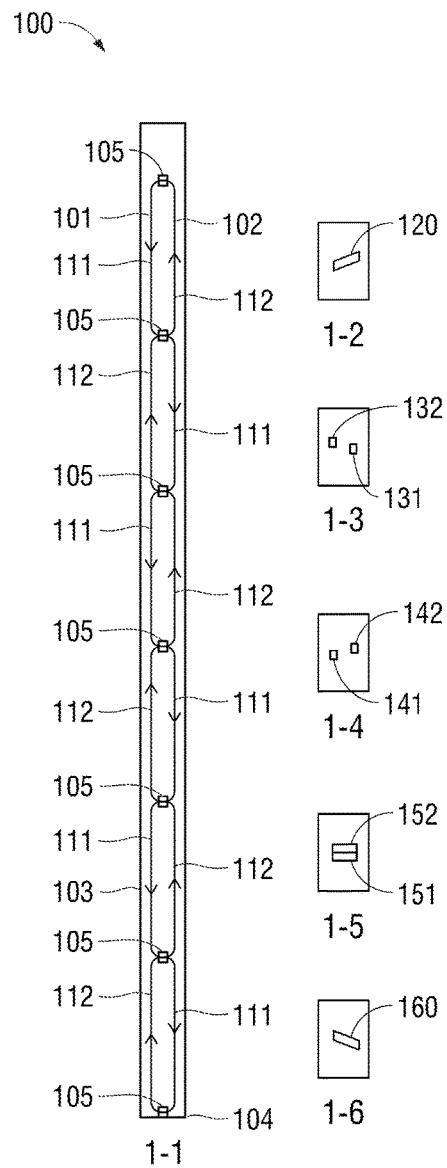
FIG. 1 is a diagram of an articulated funiculator depicting up-bound and down-bound track traversal paths, in accordance with certain embodiments.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

Vertical Living: A Fact of Life

The number of high-rise buildings has tripled in the past 30 years. In 1982 the amount of completed high-rise buildings was 2,091, in 1992 it was 3,048, in 2002 it was 4,306 and this year, 2012, we have 7,409 and the number is increasing rapidly all over the world. (Skyscrapercity, 2012).

The world has experienced unprecedented urban growth in recent decades. In 2008, for the first time, the world's population was evenly split between urban and rural areas. There were more than 400 cities with over 1 million inhabitants and 19 cities over 10 million. Developed nations were about 74% urbanized while 44% of the inhabitants of less developed countries lived in urban areas. However, urbanization is occurring rapidly in many less developed countries. It is expected that 70% of the world population will be urbanized by 2050 and most of that urban growth will occur in less developed countries. (Population Reference Bureau, 2012)

In 1950, 79% of the population of the UK lived in cities, already a large figure, but one which is set to rise to 92.2% by 2030. Elsewhere, China's percentage rose from 13% to 40.4% between the years 1950-2005 and is predicted to rise to 60.3% by 2030. But it's Botswana that has experienced the largest influx. Next year, 61.2% of its population are expected to live in urban areas yet back in 1950 only 2.7% of Botswanans lived in cities. (Data from Guardian, 2012)

In China and South East Asia many mega cities are being built and the number of skyscrapers is constantly increasing: vertical living is and will continue to be a fact of life. Efficient highrise buildings that save energy and space are in demand more than ever before. The Articulated Funiculator and the tubed mega frame is one solution to meet this growing demand. Table 1 below itemizes general information for 10 high-rise buildings and provides an overview of current tall buildings with usable floor area ratio is defined as the floor plate area minus the core area minus jumbo columns:

| Name | City | Height (m) | floors | completed | Total Number of elevators | Top Elevator Speed (m/s) | Building width (m) | Core width (m) | Floor plate (m²) | Core Area (m²) | Useable Floor Area Ratio | Building Slenderness factor |
|---|---|---|---|---|---|---|---|---|---|---|---|---|
| Ping An IFC | Shenzen | 660 | 115 | 2015 | 76 | 10 | 56 | 30 | 2925 | 964 | 0.670 | 1/12 |
| Shanghai Tower | Shanghai | 632 | 121 | 2014 | 106 | 18 | 65 | 30 | 2463 | 996 | 0.596 | 1/10 |
| Chicago Spire | Chicago | 610 | 150 | | | — | 60 | 28 | 2400 | 975 | 0.594 | 1/10 |
| Taipei 101 | Taipei | 508 | 101 | 2004 | 61 | 16.8 | 56 | 30 | 3190 | 1084 | 0.550 | 1/9 |
| Shanghai World Financial Ctr. | Shanghai | 492 | 101 | 2008 | 91 | 10 | 58 | 30 | 3334 | 882 | 0.735 | 1/9 |
| International Commerce Ctr. | Hong Kong | 484 | 108 | 2010 | 83 | 9 | 52 | 28 | 2555 | 792 | 0.690 | 1/10 |
| Petronas Towers | Kuala Lumpur | 452 | 88 | 1998 | 39 | 7 | 56 | 23 | 2356 | 600 | 0.745 | 1/8 |
| Jin Mao Tower | Shanghai | 421 | 88 | 1999 | 61 | 9 | 54 | 27 | 2356 | 602 | 0.744 | 1/8 |
| Two International Finance Ctr. | Hong Kong | 412 | 88 | 2003 | 62 | 10.6 | 55 | 26 | 2196 | 675 | 0.693 | 1/8 |
| CITIC Plaza | Guangzhou | 390 | 80 | 1996 | 36 | — | 47 | 24 | 2190 | 598 | 0.727 | 1/8 |

Rethinking Vertical Transportation

The skyscraper was born with the invention of the elevator in the 1850s and the electric elevator in 1880s. The concept of transporting people and cargo between floor levels was innovative and propelled the development of the skyscraper. As buildings grew in height, so did the number of elevators and the concept of clumping the elevators into a central lobby was introduced. Banking elevators improved efficiency and reduced wait times. Elevator speeds increased over time but the original concept of a single box inside a vertical shaft remained the same. In tall and super tall buildings this concept of vertical transportation requires many elevators and shafts and this demand diminishes the amount of leftover rentable/sellable floor space. This drawback is compounded by longer wait/travel times and higher energy consumption. It appears that as the height of buildings increase the current concept of vertical transportation needs to be rethought.

Tall and super tall buildings can be analogized to vertical cities. In a horizontal city it is common to have residences, offices, hotels, shopping malls, movie theaters, hospitals and the like and it is common to use buses and subways as a means of transportation.

The above discussion in regards to vertical transportation needs in buildings located above ground is also applicable to underground vertical transportation needs in, for example, underground mining operations and underground subway stations.

Articulated Funiculator Concept

Figure 2:
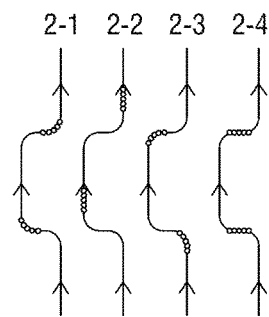
FIG. 2 is a diagram of depicting up-bound track traversal paths, in accordance with certain embodiments.
Figure 3:
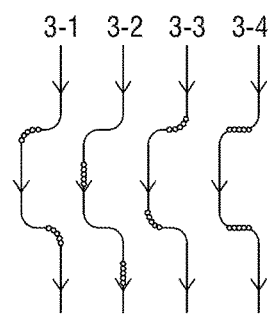
FIG. 3 is a diagram of depicting down-bound track traversal paths, in accordance with certain embodiments.

The Articulated Funiculator (FIG. 1) is a series of trains separated by some distance, for example every 250 meters. The trains lie horizontal at specific floor levels designated as "stations" and these stations are separated by, for example, every 250 meters of vertical building or underground shaft height. The trains transition from horizontal alignments at the stations to vertical alignments between the stations, albeit the passengers remain in a standing position. The trains ascend and descend on tracks that snake from one side of the building or underground shaft to the other. As shown in FIGS. 1 to 3, as the up-bound tracks traverse right, up and left, the down-bound tracks traverse left, down and right. The tracks transition together at the bottom and top of the building and make a continuous loop. The Articulated Funiculator stops at all up-bound and down-bound stations simultaneously, unloads and loads passengers, and proceeds up and down to the next stations. Intermediate floors between stations are serviced by conventional elevators.

More particularly, view 1-1 of the articulated funicular 100 of FIG. 1 shows a continuous downbound track 101 and a continuous upbound track 102 encapsulated by an exterior face of building or underground shaft 103 positioned on a ground level 104. The continuous downbound track 101 and continuous upbound track 102 intersect at stations 105. Stations 105 may be vertically separated, by a length, for example, 250 meters. Stations 105 may include an up-station and a down-station, as shown. Continuous downbound track 101 may comprise fall portions 111 of approximately this length. Continuous upbound track 102 may comprise rise portions 112 of approximately this length.

View 1-2 of the articulated funicular 100 of FIG. 1 shows a top-station (transition) 120. View 1-3 of the articulated funiculator 100 of FIG. 1 shows a shaft 131 for the downbound track and a shaft 132 for the upbound track. View 1-4 of the articulated funicular 100 of FIG. 1 shows a shaft 141 for the downbound track and a shaft 142 for the upbound track. View 1-5 of the articulated funicular 100 of FIG. 1 shows a down-station 151 and an up-station 152. View 1-6 of the articulated funicular 100 of FIG. 1 shows a bottom-station (transition) 160.

FIG. 2 shows up-bound track traversal paths; namely view 2-1 of FIG. 2 shows alignment for vertical transportation; view 2-2 shows acceleration starts, view 2-3 shows deceleration to stop, and view 2-4 shows loading at station.

FIG. 3 shows down-bound track traversal paths; namely view 3-1 of FIG. 3 shows alignment for vertical transportation; view 3-2 shows acceleration starts, view 3-3 shows deceleration to stop, and view 3-4 shows loading at station.

The looping configurations can vary (FIGS. 4-7) and depends on the building and underground shaft geometries.

Figure 4:
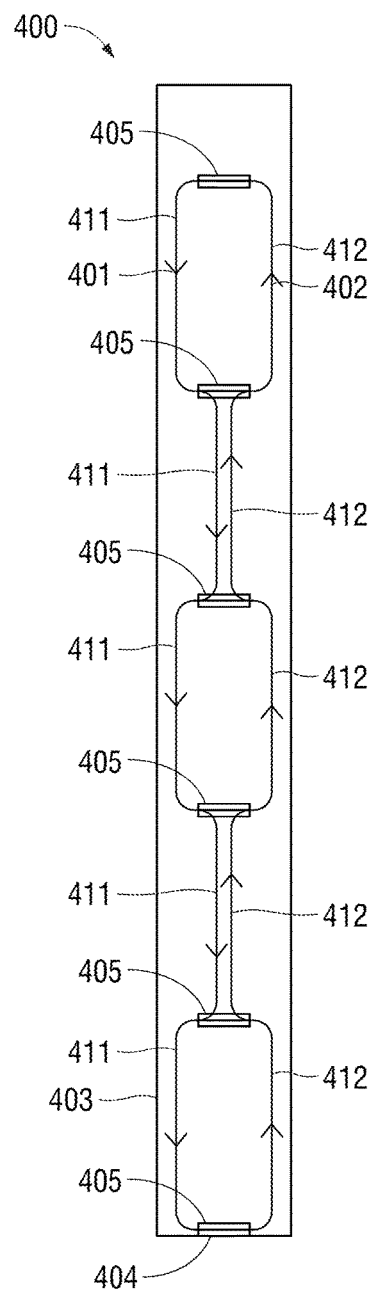
FIG. 4 is a diagram of an articulated funiculator system, including an odd loop configuration, in accordance with certain embodiments.

FIG. 4 shows an articulated funiculator system 400 with a continuous downbound track 401 and a continuous upbound track 402 encapsulated by an exterior face of building or underground shaft 403 positioned on a ground level 404. The continuous downbound track 401 and continuous upbound track 402 intersect at stations 405. Stations 405 may be vertically separated, by a length, for example, 180 meters. Stations 405 may include an up-station and a down-station, as shown. Continuous downbound track 401 may comprise fall portions 411 of approximately this length. Continuous upbound track 402 may comprise rise portions 412 of approximately this length.

Figure 5:
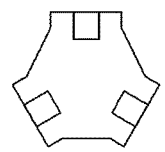
FIG. 5 is a diagram of an articulated funiculator system plan, in accordance with certain embodiments.

FIG. 5 shows an articulated funiculator system plan for an articulated funiculator, such as that shown in FIG. 4.

Figure 6:
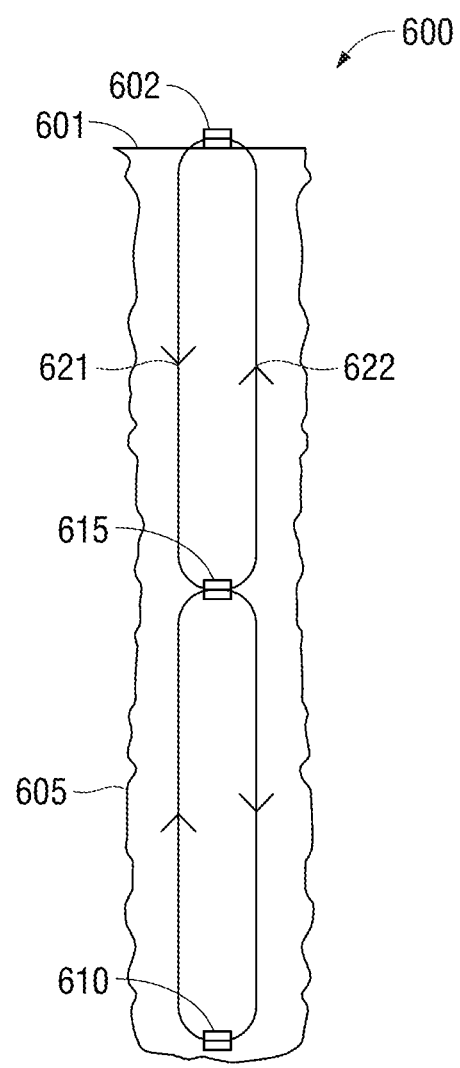
FIG. 6 is a diagram of an embodiment of an articulated funiculator system including an even loop configuration, in accordance with certain embodiments.

FIG. 6 shows an articulated funiculator system 600 with an even loop configuration. As shown, articulated funiculator system 600 is a subterranean articulated funiculator system primarily below ground level 601 (in underground shaft 605) with a ground level station 602, as shown. Articulated funiculator system 600 has a bottom station 610 and a (intermediate) station 615 between ground level station 602 and bottom station 610. Articulated funiculator system 600 includes a continuous downbound track 621 and a continuous upbound track 622 which intersect at stations 602, 615 and 610, as shown. A vertical distance may separate stations 602, 615 and 610, for example 1 kilometer.

Figure 7:
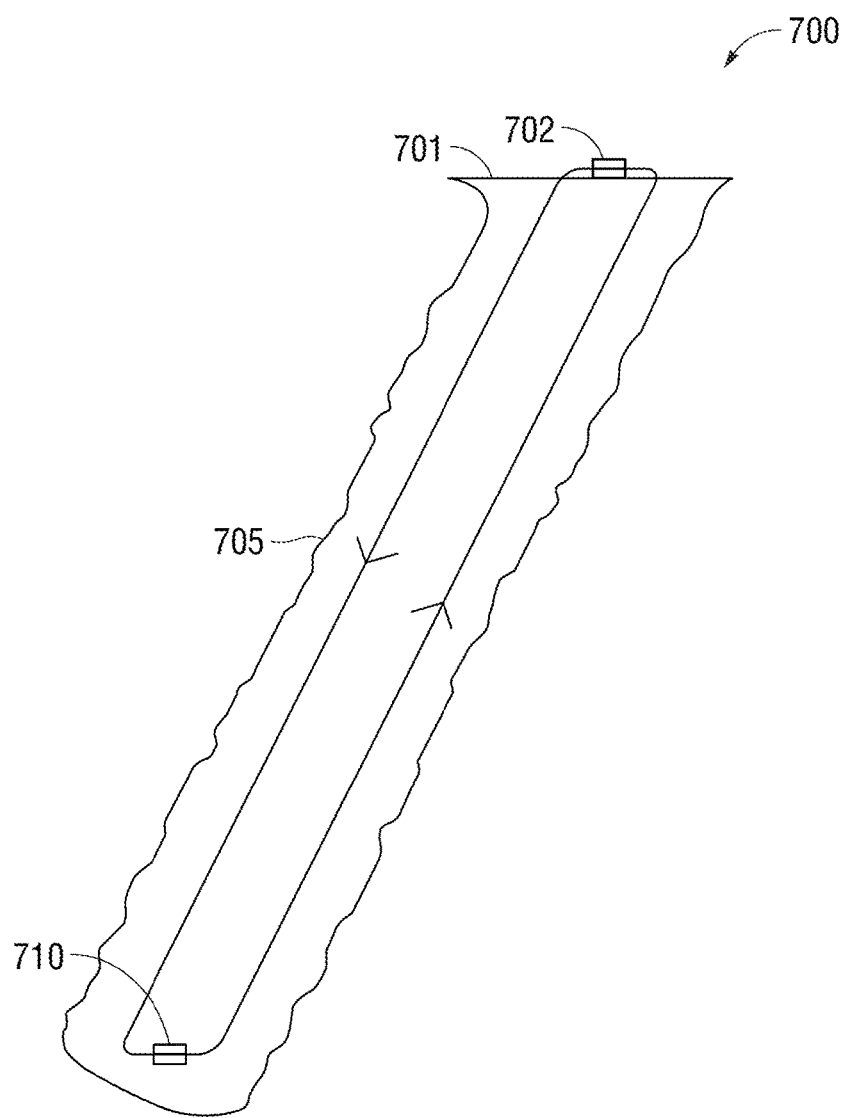
FIG. 7 is a diagram of an articulated funiculator system including a single loop configuration, in accordance with certain embodiments.

FIG. 7 shows an articulated funiculator system 700 with a single loop configuration. As shown, articulated funiculator system 700 is a subterranean articulated funiculator system primarily below ground level 701 (in underground shaft 705) with a ground level station 702, as shown. Articulated funiculator system 700 has a bottom station 710, and may traverse, for example, a vertical distance of 100 meters.

Train Concept

Aspects of the Articulated Funiculator concept involve a series of trains made of train cars and the train cars house the passenger carriages and the carriage frames. The Articulated Funiculator may be designed so that the passengers remain standing even though the train alignment transitions from horizontal to vertical. This means that the carriages will need to pitch inside the carriage frames. In addition, the Articulated Funiculator may move in such a way as to allow for the transition alignments at the tops and bottoms of buildings and underground shafts.

Movement studies of the transitions at the top and bottom of the buildings shows that a passenger carriage could experience rotation around three axes, pitch, roll and yaw (See FIGS. 8 and 9). Namely, FIG. 8 shows a diagram of possible rotation of a passenger carriage model 801 around three axes: plan angle 811, yaw 812 and pitch 813. And FIG. 9 shows a diagram of possible rotation of a passenger carriage model 901 around three axes: plan angle 911, pitch 912 and roll 913. The motion study concludes: 1.) that the carriages will need to pitch in order for the passengers to remain standing, 2.) the carriages will need to roll and yaw to facilitate the transition in the curved portion of the alignments, and 3.) the carriages will need to (only) roll to facilitate the transition in the vertical portions of the alignments. The concept to facilitate these motions is to have a cube (cuboid) shaped passenger carriage inside a spherical carriage frame. A cuboid carriage could pitch, roll and yaw inside a spherical frame.

Figure 10:
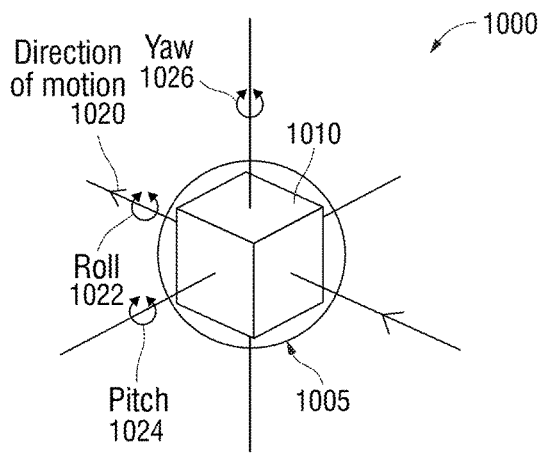
FIG. 10 is a pitch, roll and yaw diagram of an articulated funiculator including barrel shaped carriage frames with cuboid carriages, in accordance with certain embodiments.
Figure 11:
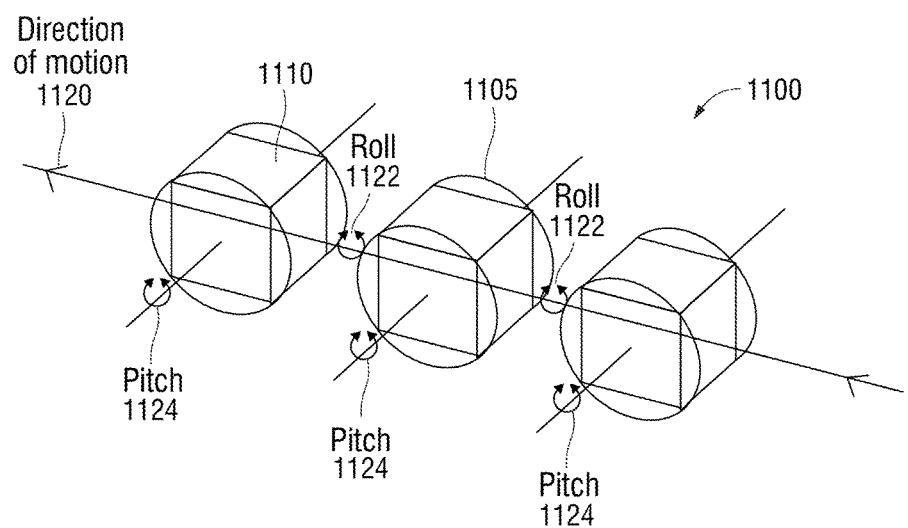
FIG. 11 is a pitch, roll and yaw diagram of an articulated funiculator including barrel shaped carriage frames with cuboid carriages, in accordance with certain embodiments.
Figure 12:
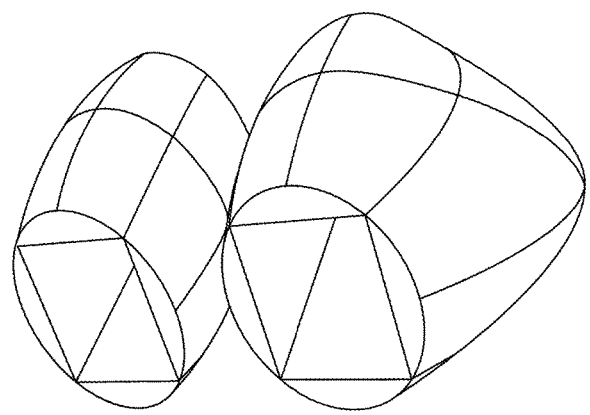
FIG. 12 is a diagram illustrating possible train configurations shaped for aerodynamics to reduce drag, in accordance with certain embodiments of funiculator train aspects.
Figure 13:
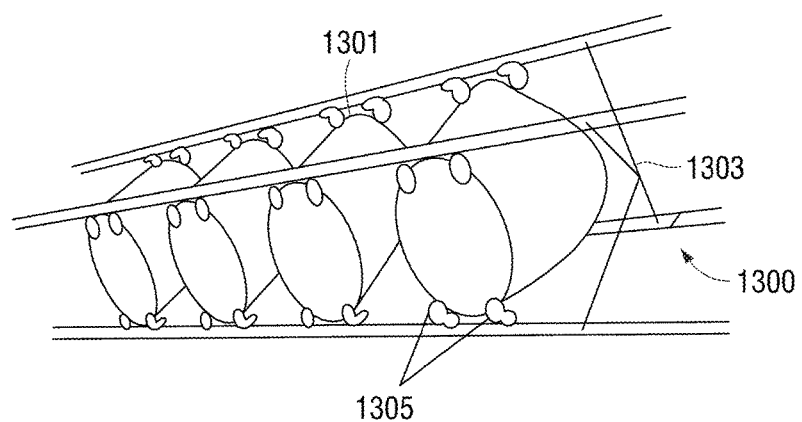
FIG. 13 is a diagram illustrating possible train configurations shaped for aerodynamics to reduce drag, in accordance with certain embodiments of funiculator train aspects.

It seems simpler to implement the transition motion in the vertical portions of the alignments rather than in the curves. This eliminates the need for the carriages to yaw. It also makes sense to take the roll motion between the train cars instead of in the carriages. This could be done with coupling mechanisms between the train cars that swivel. A possible result is a train with barrel shaped carriage frames with cuboid carriages (FIGS. 10 and 11). FIGS. 10 and 11 provide pitch, roll, and yaw diagrams. FIG. 10 shows a carriage system 1000 comprising a carriage frame 1005 and a passenger carriage 1010. FIG. 10 shows a direction of motion 1020, roll 1022, pitch 1024, and yaw 1026. FIG. 11 shows a train 1100 comprising a carriage frame 1105 and a passenger carriage 1110. FIG. 11 shows a direction of motion 1120, roll 1122, and pitch 1124. The natural progression is to form and shape the trains for aerodynamics to reduce drag, as shown in FIGS. 12 and 13. Each train car may have 8 sets of wheels and roll on four tracks.

More particularly, FIG. 13 shows a possible train configuration shaped for aerodynamics to reduce drag and funiculator train aspects. FIG. 13 shows an articulated funiculator train with four train cars, including train car 1301, on train tracks 1303. As shown, train wheels 1305 of a train car engage a train track.

A carriage frame height and width of 2.2 meters results in a carriage frame diameter of 3.11 meters based on geometry and a total carriage frame outer diameter of 3.5 meters is shown. A total frame length of 3.5 meters is also shown and results in a square train cross-section. Eventual carriage sizes will be sized to match the building and underground shaft configurations and the passenger/cargo flow demands at hand.

Movement Strategies

Figures 14, 15:
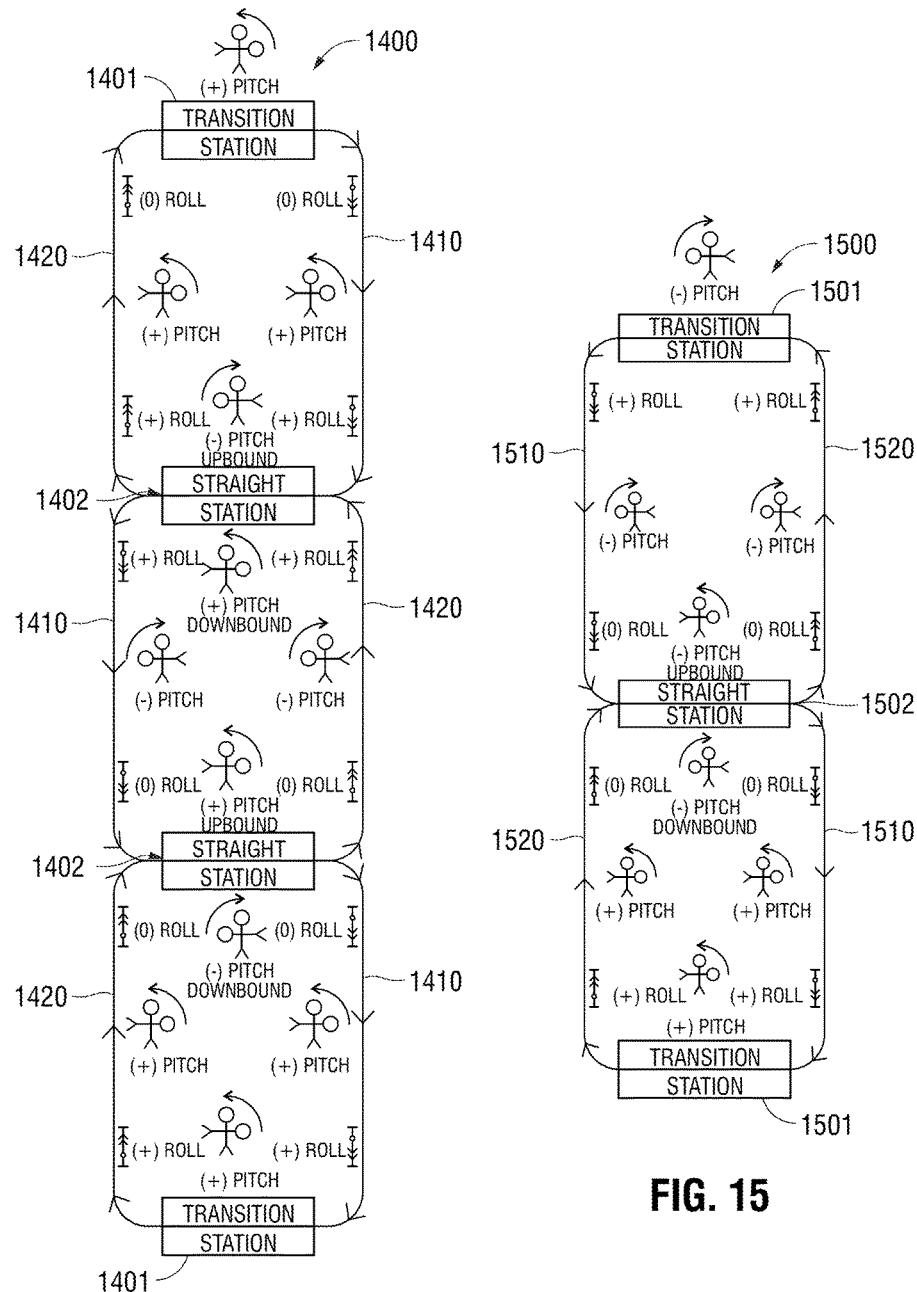
FIG. 14 is a diagram illustrating pitch and roll parameters for single and odd loop configurations, in accordance with certain embodiments.
FIG. 15 is a diagram illustrating pitch and roll parameters for single and even loop configurations, in accordance with certain embodiments.

Pitch and roll requirements for single, even and odd loop configurations are shown in FIGS. 14 and 15.

FIG. 14 shows an articulated funiculator 1400 with top and bottom transition stations 1401, and straight stations 1402 positioned between top and bottom transition stations 1401. Articulated funiculator 1400 includes a downbound track with fall portions 1410 and an upbound track with rise portions 1420.

FIG. 15 shows an articulated funiculator 1500 with top and bottom transition stations 1501, and straight station 1502 positioned between top and bottom transition stations 1501. Articulated funiculator 1500 includes a downbound track with fall portions 1510 and an upbound track with rise portions 1520.

Acceleration and Velocity Strategies

Figure 16:
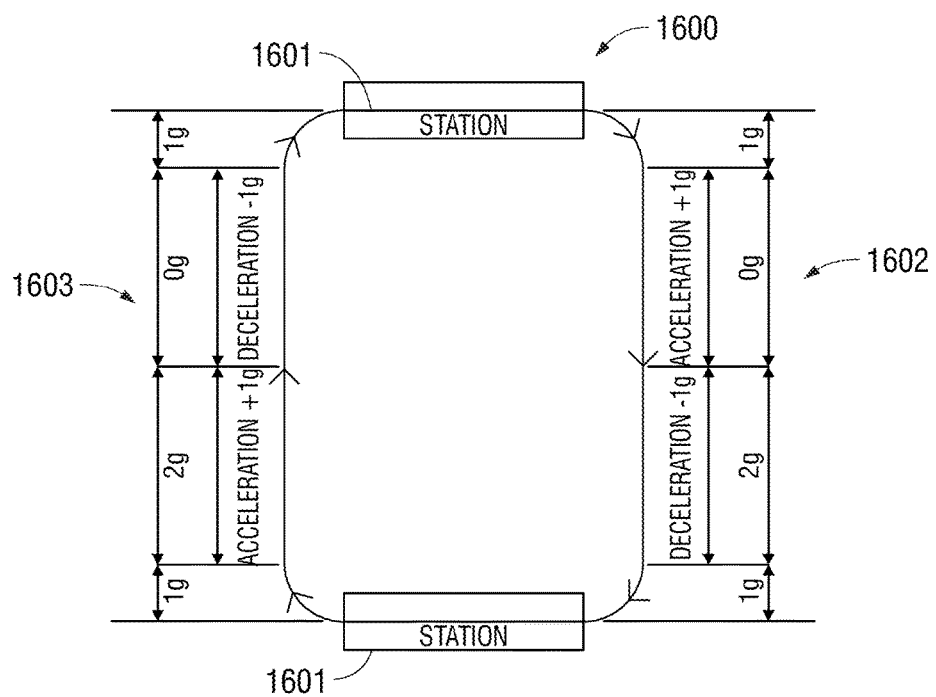
FIG. 16 is a diagram depicting acceleration and deceleration portions of the vertical legs of the articulated funiculator, in accordance with certain embodiments.

The recommended fastest acceleration on the vertical legs is 1 g. This would result in a 0 g environment on the fall accelerations and the rise decelerations and a 2 g environment on the Fall decelerations and the Rise accelerations, as illustrated in FIG. 16. FIG. 16 shows acceleration and deceleration with regard to an articulated funiculator portion 1600 of an articulated funiculator. Articulated funiculator portion 1600 includes stations 1601 connected by portions of an upbound track and a downbound track. Downbound track includes fall portion 1602. Upbound track includes rise portion 1603. Accelerations larger than 1 g would separate the passengers or cargo from the floors and necessitate restraints. With 1 g accelerations and decelerations it would take 10.1 seconds to traverse the 250 meters between the stations in our example and the train would reach a maximum speed of 178 kilometers per hour. Table 2 below is a velocity table and shows minimum times and maximum velocities for a range of rise/fall lengths:

Rise/Fall (m) Time(s) Max Velocity (km/h)

| Rise/Fall (m) | Time(s) | Max Velocity (km/h) |
|---|---|---|
| 200 | 9.03 | 159 |
| 225 | 9.58 | 169 |
| 250 | 10.10 | 178 |
| 275 | 10.59 | 187 |
| 300 | 11.06 | 195 |
| 350 | 11.95 | 211 |
| 400 | 12.77 | 225 |
| 450 | 13.55 | 239 |
| 500 | 14.28 | 252 |
| 1000 | 20.20 | 356 |
| 2000 | 28.56 | 504 |
| 3000 | 34.99 | 617 |

It is obvious that a 1 g environment would exceed the comfort level of some passengers so studies would need to be conducted to determine the maximum usable acceleration.

The cycle time between trains can be approximated for the 250 meter example. It is estimated that passenger unloading and loading of the trains at the stations could take between 20 and 30 seconds. It would also take about 5 seconds for the trains to move from the stations and position vertically before the rise/fall accelerations. This, plus the 10 second rise/fall, adds up to an estimated cycle time of 1 minute between trains at peak usage times. Train movements and cycle times can be reduced for off peak times.

Power/Braking Cogs

Figures 17, 18:
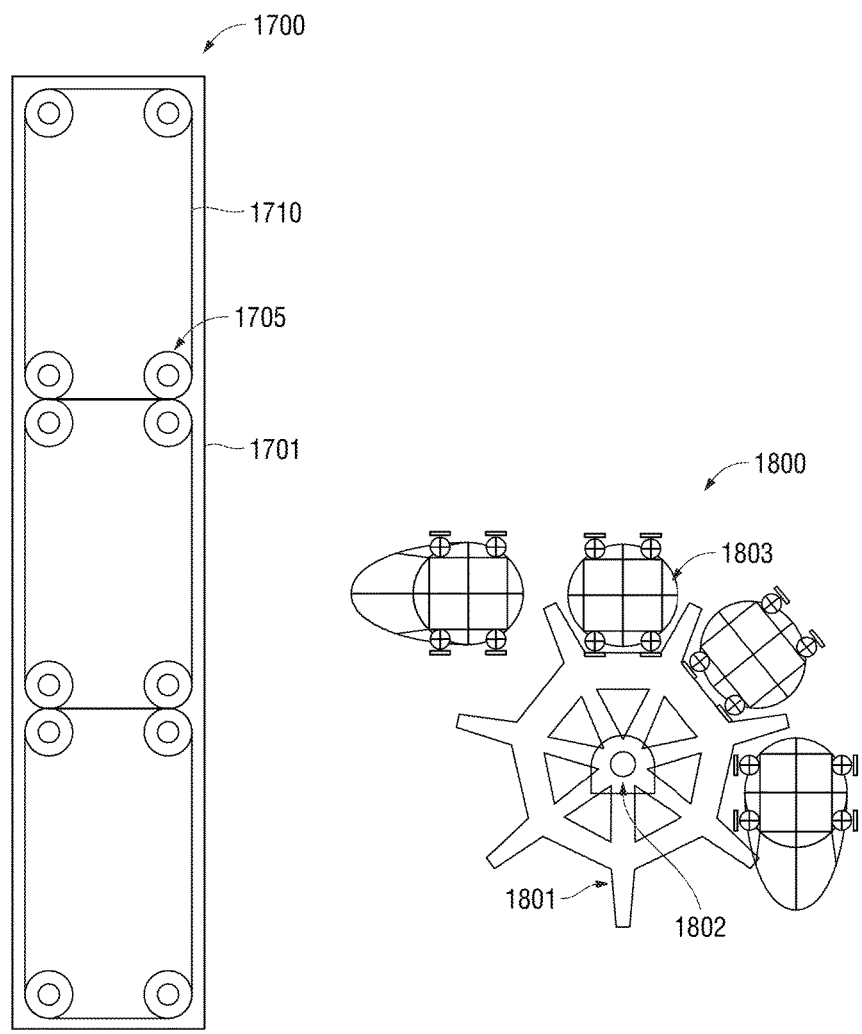
FIG. 17 is a diagram of a portion of the articulated funiculator system including cogs for power and breaking, in accordance with certain embodiments.
FIG. 18 is a diagram of a portion of the articulated funiculator system including a cog for power and breaking, and an articulated funiculator with four train cars, in accordance with certain embodiments.

The Articulated Funiculator is a series of trains connected together with cables or some other medium. The cables span between the trains and are looped around cogs where the alignments transition from horizontal at the stations to the vertical rises/falls, as shown in FIGS. 17 and 18. The cogs attach to the cables and serve to both brake and power the system. The cogs are connected to generators/motors that will capture energy while braking and power the system while driving.

More particularly, FIG. 17 shows an articulated funiculator portion 1700 of an articulated funiculator system with cogs for power and breaking. Articulated funiculator portion 1700 may be located within a building exterior or underground shaft 1701 and include power/breaking cogs 1705 and a continuous cable 1710.

FIG. 18 shows an articulated funiculator portion 1800 of an articulated funiculator system, the portion including a (power/breaking) cog 1801 for power and breaking, a generator/motor 1802, and an articulated funiculator train 1803 with four train cars.

Dynamic Braking, Energy Storage and Power Extraction

When the down-bound payloads are heavier than the up-bound the Articulated Funiculator captures the energy from braking the trains, dynamic braking, and stores it. The stored energy is then used to accelerate the Articulated Funiculator when the up-bound payloads are heavier than the down-bound. The capture and reuse of energy makes the Articulated Funiculator sustainable. For example, as lunchtime approaches most passengers will travel down the building and the energy needed to brake the Articulated Funiculator will be stored and used to power passengers up the building after lunch.

Prototype Building

Figure 19:
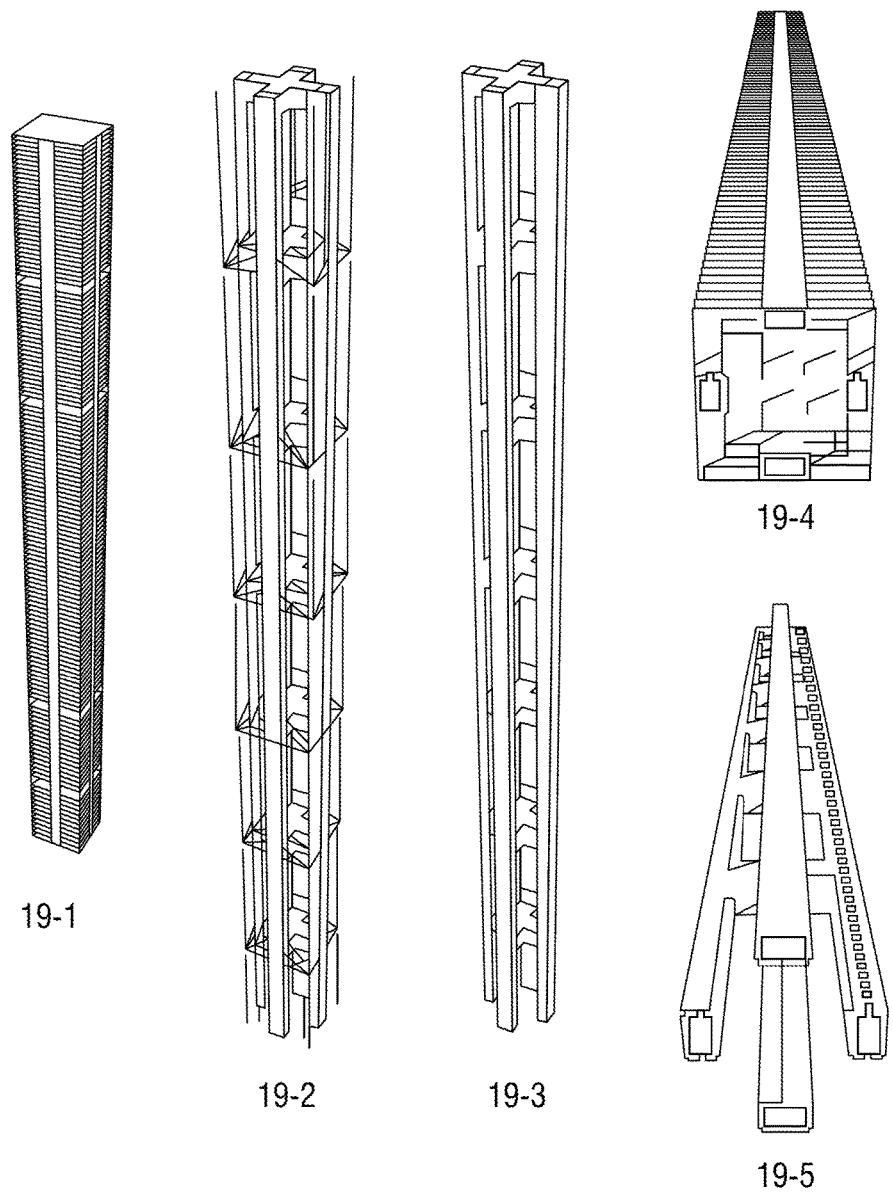
FIG. 19 is a diagram of a building and superstructure that includes four articulated funiculator stations, in accordance with certain embodiments.

To further explain the Articulated Funiculator a prototype building is shown in FIG. 19 which illustrates example building and superstructure in views 19-1 to 19-5. The building has plan dimensions of 40 meters by 45 meters and a height of 620 meters and has about 120 floors. This configuration has a slenderness factor of 1/15.5 in the short direction and 1/13.8 in the long. The building has four Articulated Funiculator stations, one at ground level, one at elevation 168 meters, one at elevation 353 meters and one at elevation 538 meters.

Station Concept

Stations for Articulated Funiculator may be 10 meters wide, wall centerline to wall centerline, and 3 stories deep, as enabled in FIGS. 20-22. Passengers enter and exit the trains from the middle story. From there, passengers have access to escalators that move them either up one floor to access conventional elevators that go up or down one floor to access conventional elevators that go down. There are doors through the stations on the upper and lower floors that provide access to the opposite side of the building. The cogs and the generators/motors may be housed inside the stations.

Figure 20A:
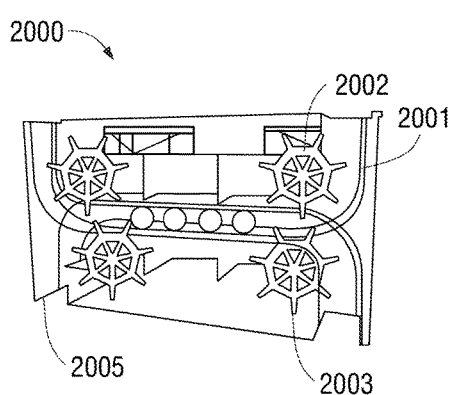
FIG. 20 illustrates example views of various aspects of the articulated funiculator system, in accordance with certain embodiments.
Figure 20B:
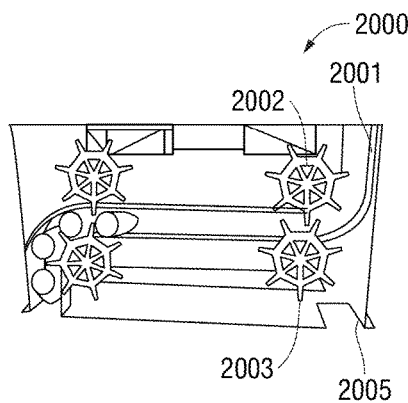
Figure 21A:
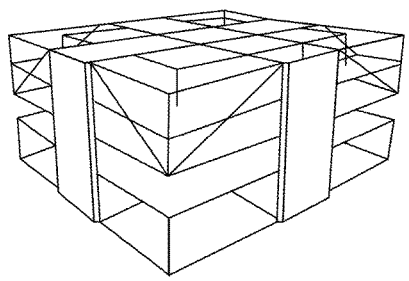
FIG. 21 illustrates example views of various aspects of the articulated funiculator system, in accordance with certain embodiments.
Figure 21B:
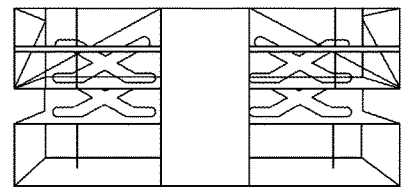
Figure 21C:
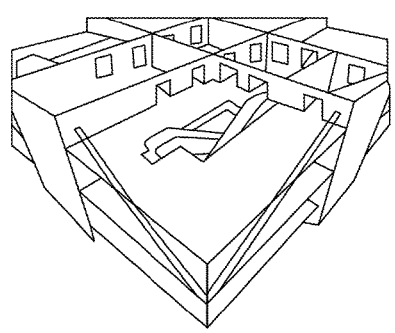
Figure 21D:
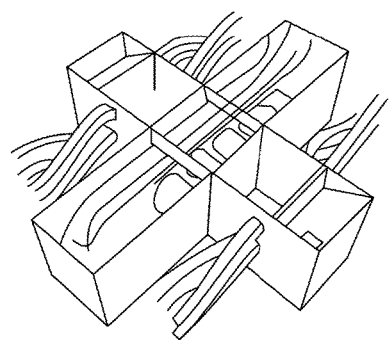

More particularly, FIGS. 20A and 20B show articulated funiculator portions 2000 of an articulated funiculator system. Articulated funiculator portions 2000 include train tracks 2001, power/breaking cogs 2002, generator package 2003, located in building structure or underground shaft 2005.

FIGS. 21A, 21B, 21C, and 21D show example views of various aspects of the articulated funiculator system. FIGS. 22A and 22B show example views of various aspects of the articulated funiculator system, including articulated funiculator trains in vertical alignment.

Structural Compatibility

The Articulated Funiculator lends itself to an efficient structural system well adapted to tall thin skyscrapers and high strength concrete. It makes sense to use the vertical corridors that house the Articulated Funiculator as the super structure as is common with central cores. The vertical legs can be, for example, 6 meters wide, wall centerline to wall centerline, and 10 meters long. This gives 8.5 meters by 4.5 meters inside clear dimensions (1.5 meter thick walls) and fits the 3.5 meter by 3.5 meter train cross-sections. It also makes sense to use the horizontal stations as the super structural as is common with outriggers. The combination of the vertical and horizontal tubes forms a tubed mega frame. Mega cross tubes can be placed at intermediate elevations between the stations and at the top of the building for structural performance. These intermediate cross tubes may be at elevations 78 meters, 264 meters, 449 meters and 615 meters. The same structural system is used in the perpendicular direction and the symmetry gives rise to the 3-D tubed mega frame, referring again to FIG. 19. All of the floor loads are transferred to the four vertical legs at station and outrigger levels with diagonals.

The length of the Articulated Funiculator is a function of the number of cars in the trains and this length sets the minimum width of the building in the direction of the stations and locates one set of the vertical legs of the tubed mega frame.

Figure 23C:
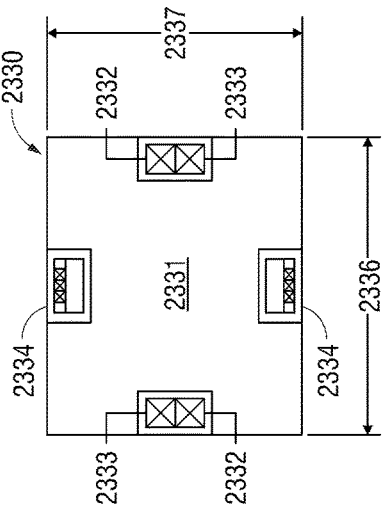
FIG. 23 is a diagram including possible layout configurations of an articulated funiculator, in accordance with certain embodiments.
Figure 23B:
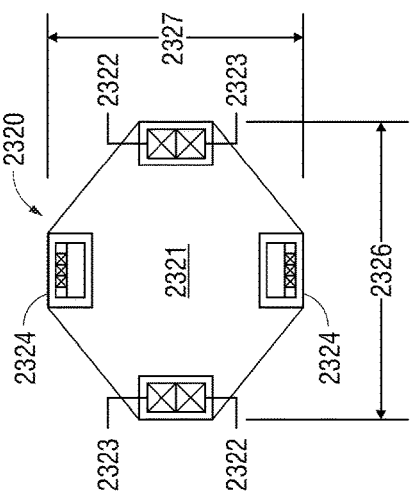
Figure 23A:
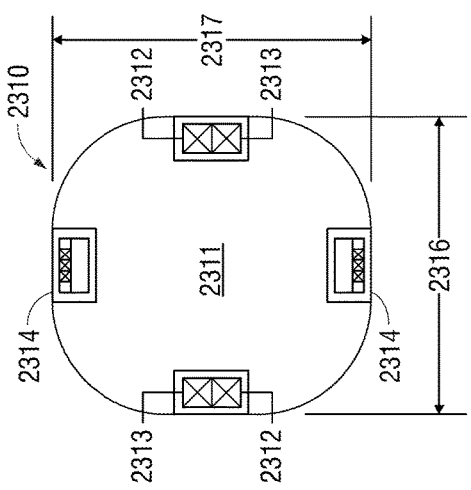

The tubed mega frame lends itself to a variety of floor plate shapes and sizes. FIGS. 23A to 23C illustrate three generic shapes and Table 3 (below) tabulates usable floor space ratios:

Floor plate Core area Floor plate Length Width Ratio

| Floor plate | Length | Width | Floor plate (m$^2$) | Core area (m$^2$) | Ratio |
|---|---|---|---|---|---|
| A | 40 | 40 | 1600 | 308 | 0.808 |
| A | 45 | 40 | 1800 | 308 | 0.829 |

-continued

| Floor plate | Length | Width | Floor plate (m²) | Core area (m²) | Ratio |
|---|---|---|---|---|---|
| A | 45 | 45 | 2025 | 308 | 0.848 |
| A | 40 | 50 | 2000 | 308 | 0.846 |
| A | 45 | 50 | 2250 | 308 | 0.863 |
| A | 50 | 50 | 2500 | 308 | 0.877 |
| B | 40 | 40 | 1180 | 308 | 0.739 |
| B | 45 | 40 | 1310 | 308 | 0.768 |
| B | 45 | 45 | 1450 | 308 | 0.787 |
| B | 40 | 50 | 1435 | 308 | 0.785 |
| B | 45 | 50 | 1560 | 308 | 0.806 |
| B | 50 | 50 | 1740 | 308 | 0.823 |
| C | 40 | 40 | 1420 | 308 | 0.783 |
| C | 45 | 40 | 1560 | 308 | 0.802 |
| C | 45 | 45 | 1780 | 308 | 0.827 |
| C | 40 | 50 | 1700 | 308 | 0.819 |
| C | 45 | 50 | 1930 | 308 | 0.840 |
| C | 50 | 50 | 2175 | 308 | 0.858 |

Usable floor area ratio is defined as the floor plate area minus the core area minus jumbo columns. The Articulated Funiculator occupies half the area of two of the vertical legs and it is expected that the other half of these shafts will be used as duct space. It makes sense to house the conventional elevators, stairs and ductwork in the remaining two legs. Placing all of the vertical transportation and ductwork inside the four legs of the structure leaves the rest of the floor plate completely open and results in high usable floor space ratios.

Referring to FIG. 23A, FIG. 23A shows an example floor layout 2310 with elevator lobby 2311, articulated funiculator 2312, stairs/ducts 2313, and conventional elevators 2314. Example floor layout 2310 is defined by a length 2316 and a width 2317.

Referring to FIG. 23B, FIG. 23B shows an example floor layout 2320 with elevator lobby 2321, articulated funiculator 2322, stairs/ducts 2323, and conventional elevators 2324. Example floor layout 2320 is defined by a length 2326 and a width 2327.

Referring to FIG. 23C, FIG. 23C shows an example floor layout 2330 with elevator lobby 2331, articulated funiculator 2332, stairs/ducts 2333, and conventional elevators 2334. Example floor layout 2330 is defined by a length 2336 and a width 2337.

Vertical Transportation Plan

Figure 24:
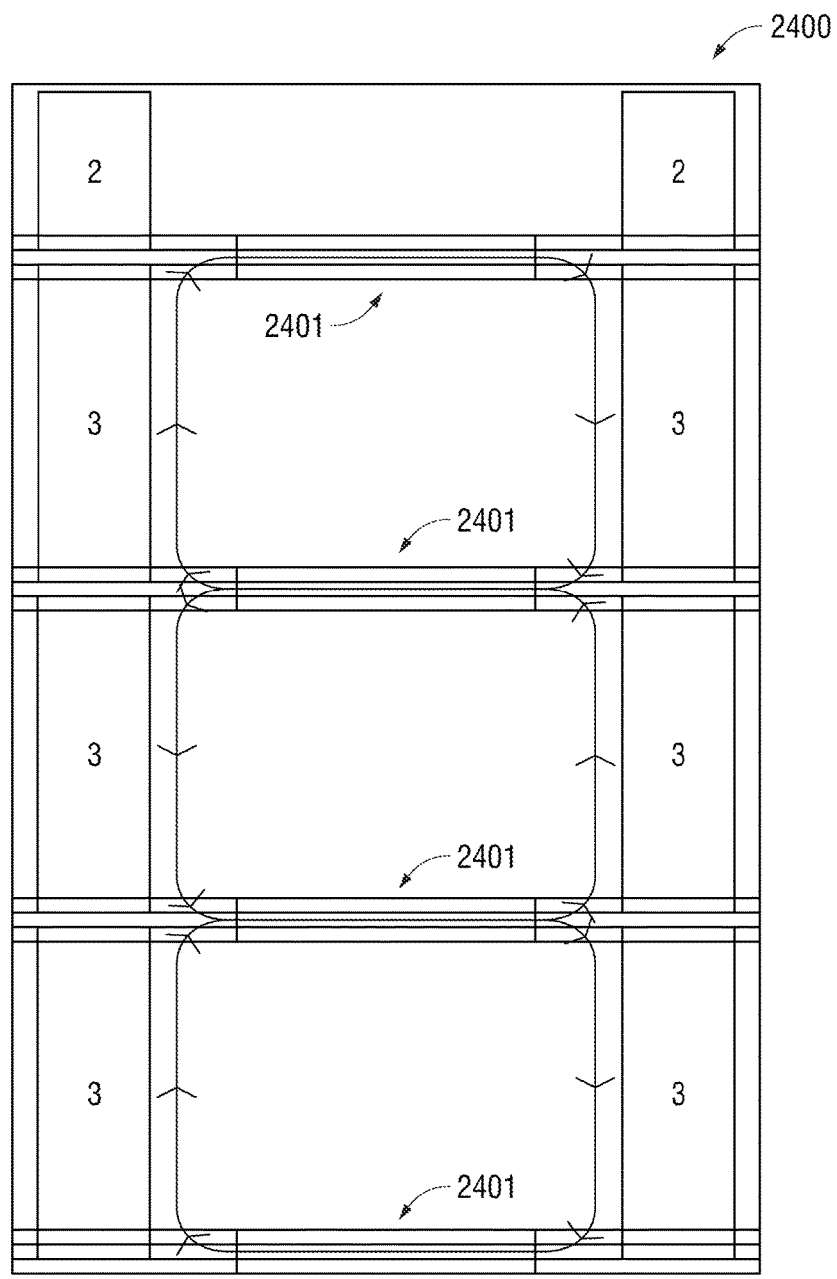
FIG. 24 is a diagram of an articulated funiculator with three loops and four stations in a possible vertical configuration, in accordance with certain embodiments.

The vertical transportation plan is a combination of one Articulated Funiculator with three loops and four stations and conventional elevators that run between the stations as described in FIG. 24. FIG. 24 shows a building and articulated funiculator 2400. Building and articulated funiculator 2400 comprises articulated funiculator stations 2401. Passengers have three options for movement. They can ride the Articulated Funiculator to a station and take conventional elevators up, ride the Articulated Funiculator to a station and take conventional elevators down or ride the conventional elevators. The third option may require a transfer from one elevator run to another. It is expected that these multiple movement options will increase the volume of passenger flow and reduce congestion.

There may be 35 inhabitable floors and 2 mechanical floors and 160 meters between stations. In this configuration, it is expected that about 6 elevators will be needed between the stations and 4 above the highest station. This results in a total of 22 elevators for the building.

Structural Performance

The tubed mega frame is an efficient structure because almost all of the loads are carried by the four vertical legs that are set at the exterior faces of the building.

The super structure has seven vertical zones and the wall thicknesses step from 1.50 meters at the base to 0.30 meters at the crown. Structural analysis runs using ETABS and a wind speed of 83 mph (37.1 m/s) indicates that a concrete strength of 60-70 MPa with minimal reinforcing ratios.

Figure 25:
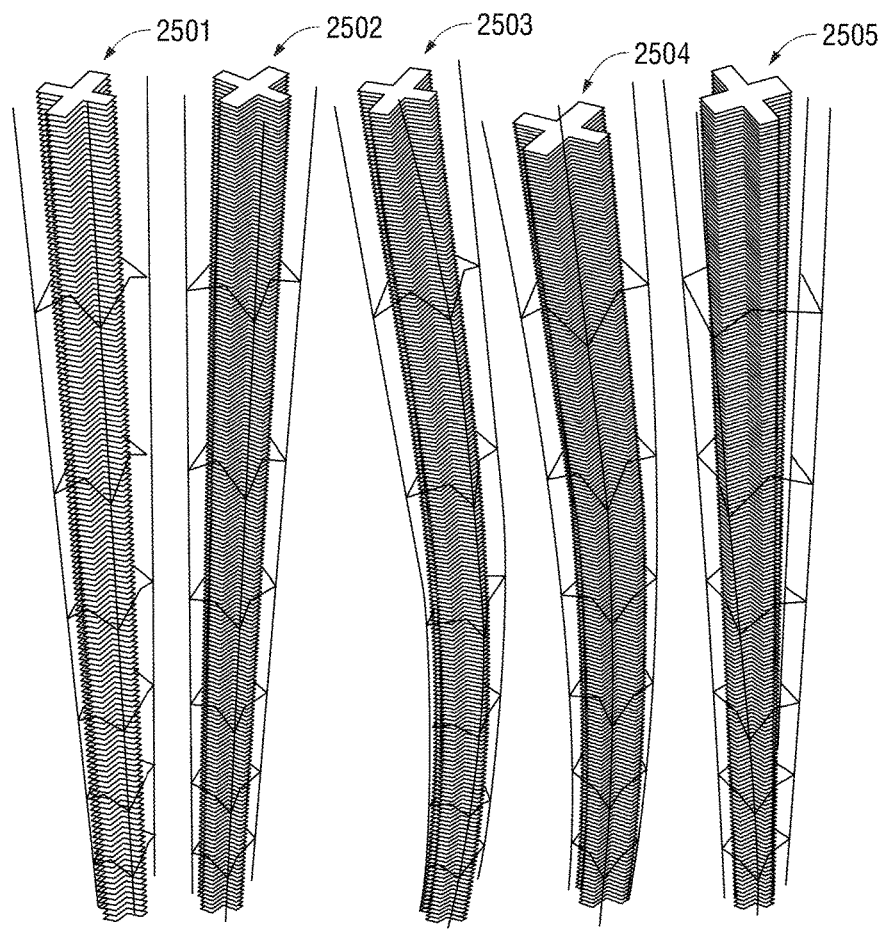
FIG. 25 illustrates possible building mode shapes and periods for tubed mega frame structures, in accordance with certain embodiments.

Five modes shapes and periods are shown in FIG. 25 showing possible building shapes 2501 to 2505. 2501 shows mode 1 in the 40 meter direction with 11.25s, 2502 shows mode 2 in the 45 meter direction with 9.80s, 2503 shows mode 3 in the 40 meter direction with 2.95s, 2504 shows mode 4 in the 45 meter direction with 2.77s, and 2505 shows mode 5 is twisting with 2.76s.

Wind speeds of 77.5 mph (34.6 m/s) result in maximum inter-story drift ratios of about H/360 in the 40 meter direction and H/540 in the 45 meter direction using a modulus of elasticity of 50.0 GPa.

Architectural Programs

The removal of the central core creates the potential for new and exciting programs that have not yet been incorporated into tall thin skyscrapers. Because the floor plates are open it is possible to program concert halls, conference rooms, theaters and swimming pools into the body of the building.

Figure 26:
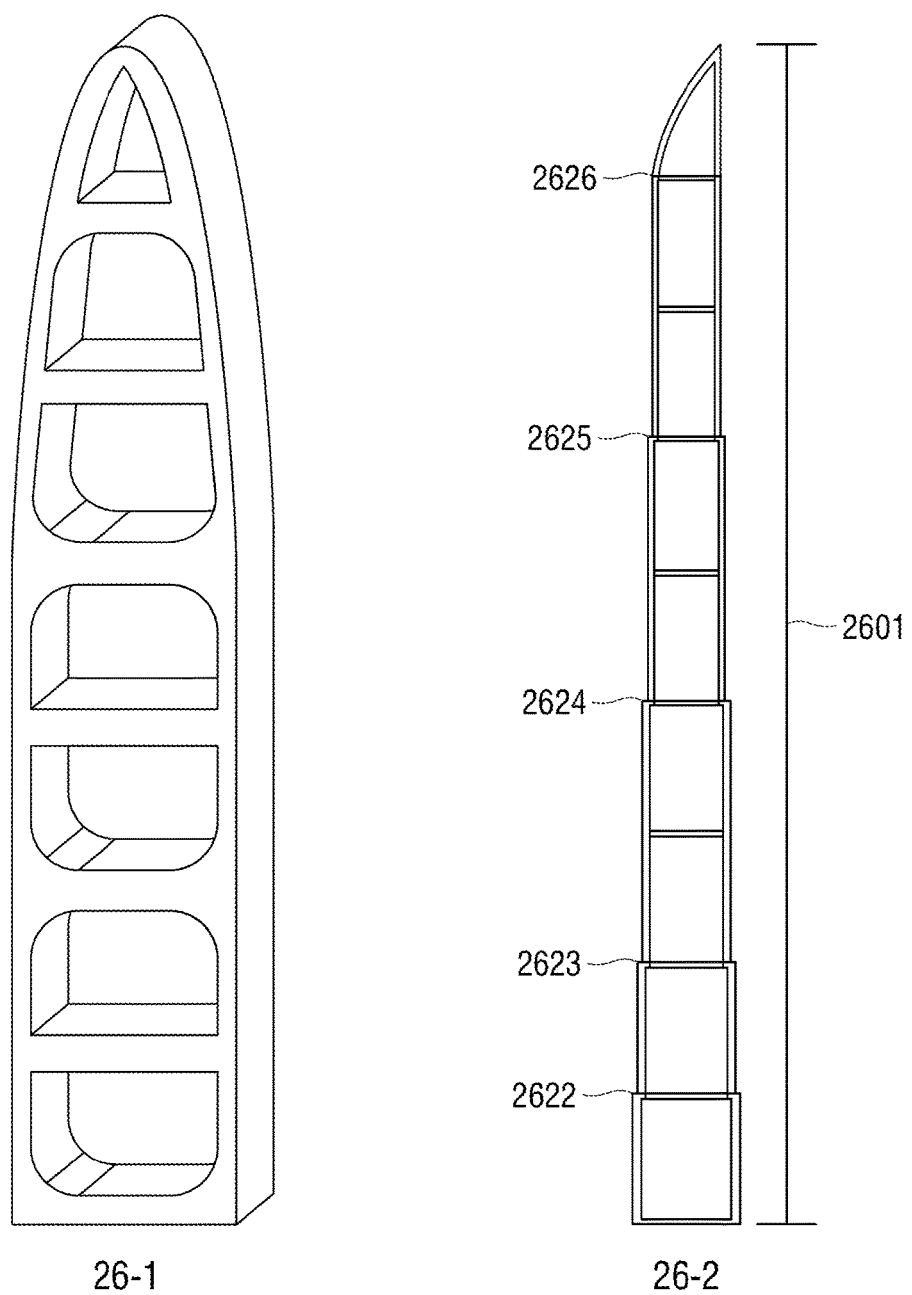
FIG. 26 illustrates a possible building configuration, in accordance with certain embodiments.

The tubed mega frame offers flexible architectural configurations and can support many forms and shapes as illustrated in FIG. 26 showing possible building configuration (as 26-1, 26-2) compatible with described aspects. Building configuration 26-2 may have a height 2621 of 800 meters. 2622 indicates 55 meters. 2623 indicates 50 meters. 2624 indicates 45 meters. 2625 indicates 40 meters. And 2626 indicates 35 meters.

Vertical living is and continues to be a fact of urban life and thus efficient and sustainable solutions for tall thin skyscrapers are needed. The goal of the Articulated Funiculator and the tubed mega frame is to increase efficiency and sustainability and to assist in the development of tall thin skyscrapers. Vertical transportation is a reality of human life and thus efficient and sustainable solutions for vertical transportation in tall buildings, underground mining operations and underground subway stations are needed.

Aspects or embodiments of the Articulated Funiculator or the Tubed Mega Frame or both, may:

Reduce the number of conventional elevators.
Reduce the number of conventional elevators shafts.
Increase the speed of passenger conveyance.
Increase the speed of cargo conveyance.
Be sustainable and reduces vertical transportation energy costs due to energy capture and reuse.
Reduce wait and cycle times.
Increase rentable/sellable floor area ratios in tall buildings.

The Articulated Funiculator may provide an alternative to conventional elevators in tall buildings, underground mines and underground subway stations and is ideally suited for any situation where there is a need to move masses of people or cargo up or down. The Articulated Funiculator can reduce the amount of conventional elevators, reduce the number of conventional elevator shafts, reduce wait and cycle times, increase the speed of passenger and cargo conveyance, reduce the energy costs associated with vertical transportation due to energy capture and reuse and increase rentable/sellable floor space in tall buildings. High speeds, large passenger/cargo volumes and recyclable energy makes the Articulated Funiculator the way of the future. It is time for a new generation of elevator systems to take a step forward.

REFERENCES

Skyscrapercity, 2012, http://skyscrapercity.com [Accessed April 2012].

Population Reference Bureau, 2012, http://prb.org [Accessed April 2012].
Guardian,2012,http://www.guardian.co.uk/news/datablog/2009/aug/18/percentagepopulation-living-cities [Accessed April 2012].
Binder, G., 2006. 101 of the World's Tallest Buildings. Images Publishing.
Council on Tall Buildings and Urban Habitat, 2012. CTBUH Skyscraper Center.
http://skyscrapercenter.com [Accessed April 2012].
Sarkisian, M., 2006. Jin Mao Tower's Influence on China's New Innovative Tall Buildings, Council on Tall Buildings and Urban Habitat.
Xi a, J., Poon, D. & Mass, D. c., 2010. Case Study: Shanghai Tower. CTBUH Journal, Issue II, pp. 12-18.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

The invention claimed is:

1. A structural system for a building, the building comprising a first floor, a second floor and a third floor, and the structural system comprising at least two vertical legs at the exterior faces of the building between corners of the building and at least one elongated horizontal member connecting two or more of the vertical legs, the vertical legs and the elongated horizontal member forming a frame, wherein the structural system and the building lacks a central elevator core, wherein the vertical legs define an interior volume, wherein a first floor plate of the first floor spans a continual first horizontal plane of the interior volume bounded by the vertical legs to be structurally coupled to the vertical legs and has a first floor load, a second floor plate of the second floor spans a continual second horizontal plane of the interior volume bounded by the vertical legs to be structurally coupled to the vertical legs and has a second floor load, and a third floor plate of the third floor spans a continual third horizontal plane of the interior volume bounded by the vertical legs to be structurally coupled to the vertical legs and has a third floor load, and wherein all of the first floor load, all of the second floor load and all of the third floor load are transferred to the vertical legs.

2. The structural system according to claim 1, wherein the structural system comprises four vertical legs and four vertical tubes, and each vertical leg of the four vertical legs comprises a vertical tube of the four vertical tubes.

3. The structural system according to claim 2, wherein two vertical tubes of the four vertical tubes include an internal volume configured to house elevators.

4. The structural system according to claim 2, wherein two vertical tubes of the four vertical tubes include an internal volume configured to house conventional elevators, stairs and ductwork.

5. The structural system according to claim 1, wherein at least one of the vertical legs comprises a vertical tube that is configured to house an elevator.

6. The structural system according to claim 1, wherein the elongated horizontal member is a tube including an internal volume configured to house an elevator.

7. The structural system according to claim 1, wherein the elongated horizontal member is located at an intermediate elevation between the first floor and a top of the building.

8. The structural system according to claim 1, wherein the vertical legs are constructed of concrete or steel.

9. The structural system according to claim 1, wherein the vertical legs are constituted by vertical tubes and wherein a set of the vertical tubes include an internal volume configured to house elevators.

10. The structural system according to claim 1, wherein an area of the at least one elongated horizontal member in a horizontal plane is less than each of an area of the first horizontal plane of the interior volume, an area of the second horizontal plane of the interior volume, and an area of the third horizontal plane of the interior volume.

11. The structural system according to claim 1, wherein
the frame comprises a first elongated horizontal member at a first elevation and a second elongated horizontal member at a second elevation different than the first elevation, without an additional elongated horizontal member being located between the first elevation and the second elevation; and
the first floor, the second floor and the third floor are arranged between the first elongated horizontal member and the second elongated horizontal member.

12. The structural system according to claim 1, wherein vertical legs are not located at the corners of the building.

13. A building lacking a central elevator core, the building comprising:
exterior faces;
a structural system comprising at least two vertical legs positioned at the exterior faces of the building between corners of the building and at least one elongated horizontal member connecting two or more of the vertical legs, the vertical legs and the elongated horizontal member forming a frame, wherein the vertical legs define an interior volume;
a first floor comprising a first floor plate, the first floor plate spanning a continual first horizontal plane of the interior volume bounded by the vertical legs to be structurally coupled to the vertical legs and having a first floor load; and
a second floor comprising a second floor plate, the second floor plate spanning a continual second horizontal plane of the interior volume bounded by the vertical legs to be structurally coupled to the vertical legs and having a second floor load,
wherein all of the first floor load and all of the second floor load are transferred to the vertical legs.

14. The building according to claim 13, wherein the structural system comprises four vertical legs and four vertical tubes, and each vertical leg of the four vertical legs comprises a vertical tube of the four vertical tubes.

15. The building according to claim 14, wherein two vertical tubes of the four vertical tubes include an internal volume configured to house elevators.

16. The building according to claim 14, wherein two vertical tubes of the four vertical tubes include an internal volume configured to house conventional elevators, stairs and ductwork.

17. The building according to claim 13, wherein at least one of the vertical legs comprises a vertical tube that is configured to house an elevator.

18. The building according to claim 13, wherein the elongated horizontal member is a tube including an internal volume configured to house an elevator.

19. The building according to claim 13, wherein the elongated horizontal member is located at an intermediate elevation between the first floor and a top of the building.

20. The building according to claim 13, wherein the vertical legs are constructed of concrete or steel.

21. The building according to claim 13, wherein the vertical legs are constituted by vertical tubes and wherein a set of the vertical tubes include an internal volume configured to house elevators.

22. The building according to claim 13, wherein an area of the at least one elongated horizontal member in a horizontal plane is less than each of an area of the first horizontal plane of the interior volume, an area of the second horizontal plane of the interior volume, and an area of the third horizontal plane of the interior volume.

23. The building according to claim 13, wherein
the frame comprises a first elongated horizontal member at a first elevation and a second elongated horizontal member at a second elevation different than the first elevation, without an additional elongated horizontal member being located between the first elevation and the second elevation; and
the first floor and the second floor are arranged between the first elongated horizontal member and the second elongated horizontal member.

24. The building according to claim 13, wherein the vertical legs are not located at the corners of the building.

* * * * *